March 20, 1962 W. C. MARCHAND 3,026,154
BEARING MEANS
Filed July 13, 1959 2 Sheets-Sheet 1
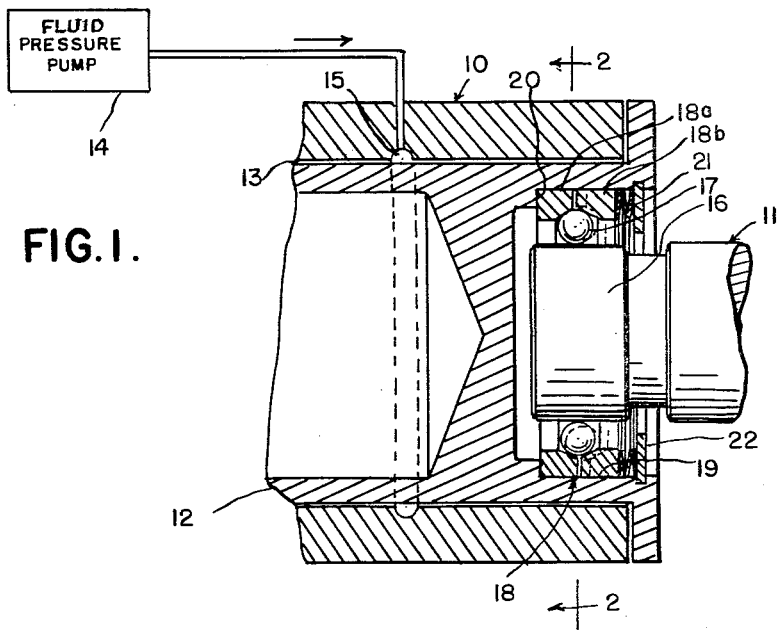
FIG. 1.
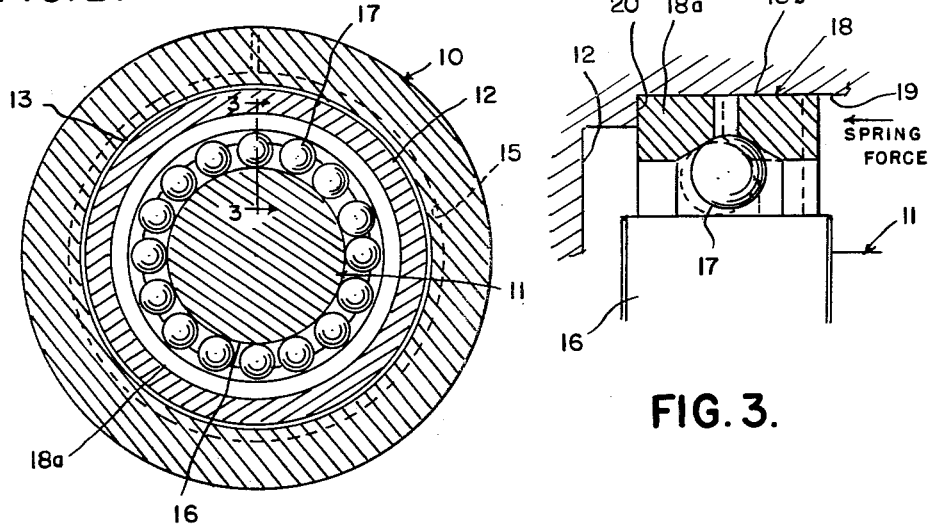
FIG. 2.
FIG. 3.
*INVENTOR.*
WILLIAM C. MARCHAND
BY
ATTORNEYS March 20, 1962 W. C. MARCHAND 3,026,154
BEARING MEANS
Filed July 13, 1959 2 Sheets-Sheet 2

INVENTOR.
WILLIAM C. MARCHAND
BY
ATTORNEYS

United States Patent Office 3,026,154
Patented Mar. 20, 1962

3,026,154
BEARING MEANS
William Charles Marchand, Detroit, Mich., assignor to Continental Aviation and Engineering Corporation, Detroit, Mich., a corporation of Virginia
Filed July 13, 1959, Ser. No. 826,804
4 Claims. (Cl. 308—35)

My invention relates to anti-friction bearings and more particularly to a means of supporting an air or other fluid pressure bearing carried rotating member until a speed is attained at which the fluid pressure bearing becomes operatively effective.

The use of fluid pressure lubricated bearings such as air bearings poses certain problems which heretofore have either not been recognized or, if recognized, never effectively solved. One difficulty is encountered in fields such as gas turbines or other prime movers in which the fluid pressure for the fluid pressure bearing is produced by operation of the machine. Thus, until the machine reaches operative speed, pressurized fluid for the bearing must be obtained from some other source such as a compressed air tank or an auxiliary pump carried by the vehicle or engine, driven from some source entirely divorced from the engine.

Another problem is that until the fluid pressure bearing supported parts are rotating at a certain minimum speed, dependent on fluid pressure and bearing clearance, the fluid will not adequately support the rotating element, so that friction between the moving parts is apt to cause heat and scoring.

An object of the present invention is to solve the aforesaid difficulties by providing an improved and simplified combination of a fluid pressure bearing and mechanical bearing.

Another object of the invention is to facilitate use of fluid pressure bearings by providing a supplemental mechanical bearing operable to support the rotating parts until such time as the fluid pressure bearing becomes operatively effective.

For a more complete understanding of the invention reference may be had to the accompanying drawings illustrating preferred embodiments of the invention in which like reference characters refer to like parts throughout the several views and in which FIG. 1 is a fragmentary cross-sectional view of supporting and rotating components embodying the present invention.

FIG. 2 is a cross-sectional view taken substantially on the line 2—2 of FIG. 1.

FIG. 3 is a fragmentary cross-sectional detail view taken substantially on the line 3—3 of FIG. 2 but illustrating an altered position of the mechanical bearing.

Figure 4:
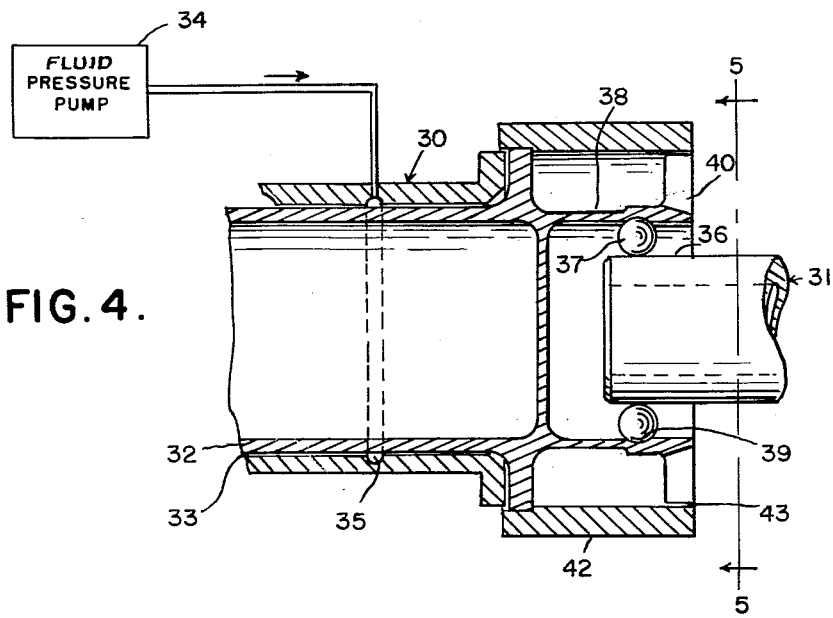
FIG. 4 is a cross-sectional view illustrating another modification of the invention.

For convenience, the fluid pressure bearing is shown and described as an air bearing, although other gases or liquids will be as effective.

As illustrated in FIGS. 1-3, supporting structure portions 10 and 11 are arranged to carry a rotating element or shaft 12. The portion 10 is arranged to have a clearance 13 between it and the element 12 to provide an air bearing. Air or other fluid is pressurized by any means such as a pump 14 and delivered to an annular groove 15 for supplying fluid pressure into the clearance space 13.

The present components may be part of a gas turbine or the like which is operable when running to drive the air pressure pump 14. In such an arrangement, air would not be delivered until the turbine was in operation.

The supporting portion 11 is provided with a bearing surface 16 forming an inner race for running elements or bearings 17 which are engaged with the portions 18a and 18b of an outer split race 18 carried in a recess 19 of the rotating element 12. One portion 18a abuts an inner shoulder 20 of the recess 19, while the other portion 18b is resiliently urged inwardly by any means such as a compression spring 21 abutting a retainer ring 22. Thus the bearings 17 are resiliently urged into running contact with the bearing surface 16 of the support portion 11, and act to support the rotating element 12.

The bearings 17 are, however, responsive to speed of the rotating element 12 due to centrifugal forces acting on the bearing 17, and the components are so arranged that shortly after the speed of the rotating element 12 is attained at which the air bearing is effective to support the element 12, the bearings 17 move out radially to force the outer race portion 18b against the spring force, axially separating the outer race portions 18a and 18b so that the bearings 17 are disengaged from the bearing surface 16 as shown in FIG. 3.

Immediately as the bearings 17 are no longer in contact with the surface 16, they are no longer restrained and will immediately tend toward the speed of rotation of the element 12, whereby centrifugal force on the bearings 17 increases to effect even more positive disengagement, so that there will be no intermediate stage at which the bearings would tend to oscillate between the engaged and the disengaged positions.

When the speed is reached at which the mechanical bearing is disengaged, the air bearing, having all the well known advantages of substantially frictionless support, is fully operative by itself. At this speed also, the air pump, if dependent on operation of the turbine as indicated above, will be able to supply the required air for the air bearing, thus eliminating all need for other starting air sources.

Figure 5:
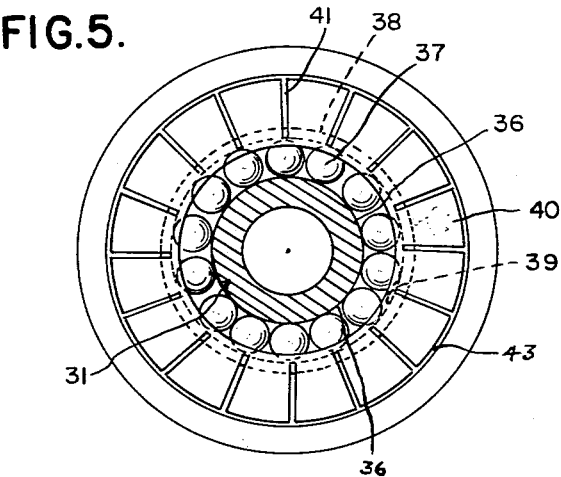
FIG. 5 is a cross-sectional view taken substantially on the line 5—5 of FIG. 4.

In FIGS. 4 and 5, a simplified modification is shown as comprising supporting portions 30 and 31 arranged to carry a rotating shaft 32. As in the previously described structure, a clearance 33 is provided between the shaft 32 and the supporting portion 30 to provide an air bearing, and air is supplied under pressure from an air pump 34 to an annular groove 35.

The supporting portion 31 is provided with a bearing surface 36 forming an inner race for bearings 37. The shaft 32 is provided with a relatively thin cylindrical portion 38 which has a groove 39 forming an outer race for the bearings 37. The portion 38 is constructed to resiliently force the bearings 37 radially inward into engagement with the bearing surface 36 providing for a no clearance mechanical bearing operable at slow speeds. The outer end of the cylindrical portion 38 is provided with a relatively heavy radially extending segmented flange 40, which is preferably formed in one piece and then segmented by cutting a plurality of equally spaced slots 41 as shown in FIG. 5. An annular ring 42 is carried by the shaft 32 and is radially spaced from the segmented flange 40 as at 43.

In operation, as the shaft 32 picks up speed, centrifugal forces act on the bearings 37 and the flange 40 to throw the segments of the flange 40 outward, radially stretching or extending the relatively thin cylindrical portion 38 to cause a clearance for the bearings 37, at which time the shaft 32 will become wholly supported by the fluid bearing. The clearance between the segmented flange 40 and the annular ring 42 is small enough so that contact is made between these members before excessive stress is incurred in portion 38.

Although I have described only two preferred embodiments of my invention, it will be apparent that various changes and modifications may be made therein without

I claim:

1. A bearing means for supporting a rotating element, comprising a fluid pressure bearing, a mechanical bearing, resilient means operable to maintain said mechanical bearing operably effective and means responsive to the speed of the rotating element to build up forces opposed to said resilient means and to cause said mechanical bearing to become operably ineffective shortly after said rotating element attains a speed at which said fluid pressure bearing becomes operatively effective, and means supplying fluid under pressure to said fluid pressure bearing.

2. A bearing means for supporting a rotating element, comprising a support structure having a small clearance with respect to said rotating element to provide a fluid pressure bearing, mechanical bearing surface elements carried by said rotating element and by said support structure, running members between said bearing surface elements, means resiliently urging said running members into bearing contact with said bearing surface elements, said running members being operable in response to centrifugal forces to axially separate said bearing surface elements an amount sufficient to disengage such from one of said bearing surface elements due to centrifugal forces shortly after said rotating element attains a speed at which said fluid pressure bearing becomes operatively effective.

3. A bearing means for supporting a rotating element, comprising a support structure having a small clearance with respect to said rotating element to provide a fluid pressure bearing, mechanical bearing surface elements carried by said rotating element and by said support structure, running members between said bearing surface elements, the bearing surface element carried by said rotating element comprising an outer split race, means resiliently urging the portions of said split race together to thereby urge said running members into engagement with the other bearing surface element carried by said support structure, said running members being responsive to centrifugal force and operable to separate said split race and to disengage from the bearing element carried by said support structure due to attaining sufficient centrifugal force shortly after said rotating element attains a speed at which said air bearing becomes operatively effective.

4. A bearing means for supporting a rotating element, comprising a support structure having a small clearance with respect to said rotating element to provide a fluid pressure bearing, bearing surface elements carried by said rotating element and by said support structure, running members between said bearing surface elements, the bearing surface element carried by said rotating element being operable to resiliently urge said running members into no-clearance bearing contact with the other bearing surface element carried by said support structure during relatively slow speeds at which said fluid pressure bearing is inoperative and centrifugal forces acting on the bearing surface element carried by said rotating element being operable at relatively higher speeds to resiliently urge said bearing surface elements apart and to disengage said running members from the other bearing surface element carried by said support structure.

References Cited in the file of this patent

UNITED STATES PATENTS

| | | |
|---|---|---|
| 2,182,012 | Bunnell | Dec. 5, 1939 |
| 2,623,353 | Gerard | Dec. 30, 1952 |